United States Patent
Silva et al.

(10) Patent No.: US 10,745,100 B2
(45) Date of Patent: Aug. 18, 2020

(54) COUNTERBALANCE ASSEMBLIES FOR UPWARDLY OPENING AIRCRAFT DOORS AND AIRCRAFT INCLUDING SAME

(71) Applicant: EMBRAER S.A., São José dos Campos—SP (BR)

(72) Inventors: Oberdan Martins Silva, São José dos Campos (BR); Saint Clair Trisotto, São José dos Campos (BR); Brian Admas Linhares, São José dos Campos (BR); Jorge Toshio Hashimoto, São José dos Campos (BR); Paulo Junio Sacramento Horta Moreira, São José dos Campos (BR); Ricardo Pamplona Lang, São José dos Campos (BR)

(73) Assignee: EMBRAER S.A., São José dos Campos—SP (BR)

( * ) Notice: Subject to any disclaimer, the term of this patent is extended or adjusted under 35 U.S.C. 154(b) by 778 days.

(21) Appl. No.: 15/403,519

(22) Filed: Jan. 11, 2017

(65) Prior Publication Data
US 2018/0195331 A1    Jul. 12, 2018

(51) Int. Cl.
*B64C 1/14* (2006.01)

(52) U.S. Cl.
CPC .................... *B64C 1/143* (2013.01)

(58) Field of Classification Search
CPC ... B64C 1/1407; B64C 1/1423; B64C 1/1461; B64C 1/143; E05Y 2900/502; E05D 13/1207; E05D 13/10
See application file for complete search history.

(56) References Cited

U.S. PATENT DOCUMENTS

| | | | |
|---|---|---|---|
| 3,585,757 A | | 6/1971 | Ritchie et al. |
| 4,047,441 A | * | 9/1977 | Kellogg ................ B64C 1/1407 74/52 |
| 4,125,235 A | * | 11/1978 | Fitzgerald ............... B64C 1/143 244/129.5 |
| 4,375,876 A | * | 3/1983 | Stewart ................. B64C 1/1438 160/201 |

(Continued)

FOREIGN PATENT DOCUMENTS

| | | | |
|---|---|---|---|
| CA | 2324886 A1 * | 10/1999 | ............. B64G 1/222 |
| JP | 2017160773 A * | 9/2017 | ............. E06B 9/0676 |

*Primary Examiner* — Benjamin P Lee
(74) *Attorney, Agent, or Firm* — Nixon & Vanderhye P.C.

(57) ABSTRACT

Counterbalance assemblies include a torsion bar spring for counter-balancing the weight of upwardly opening aircraft doors for ease of opening and closing. The torsion bar spring may be linked to the aircraft door through an integrated gear reduction system comprised of two pairs of spur gears and respective shafts as well as a linkage assembly. A cable reel is connected to the output shaft and the input shaft is connected to a four bar linkage system attached to the end of the torsion bar. The cable reel stores the lift cable and provides the output torque to lift the aircraft door. When the aircraft door opens or closes, the center of mass loses or gains height respectively, causing a variation of gravitational potential energy. In such a manner, the gravitational potential energy is exchanged with strain elastic energy from the counter-balance spring therefore reducing the required external source of energy whether it is from a power assisted means or manual operation.

30 Claims, 11 Drawing Sheets

(56) References Cited

U.S. PATENT DOCUMENTS

| | | | | |
|---|---|---|---|---|
| 4,470,566 A | * | 9/1984 | Fitzgerald | B64C 1/1407 244/129.1 |
| 5,255,876 A | * | 10/1993 | Fleming | B64C 1/1407 16/362 |
| 5,735,020 A | | 4/1998 | Wheeler | |
| 6,045,204 A | * | 4/2000 | Frazier | B64D 11/003 16/370 |
| 9,033,277 B2 | | 5/2015 | Berthoud | |

* cited by examiner

COUNTERBALANCE ASSEMBLIES FOR UPWARDLY OPENING AIRCRAFT DOORS AND AIRCRAFT INCLUDING SAME

FIELD

The embodiments disclosed herein relate generally to counterbalance assemblies intended to assist the lifting of an aircraft door that slides inwardly and upwardly along lateral guide tracks when opened. Conversely, when closing of such a door, the counterbalance assemblies disclosed herein serve to counterbalance the door weight to prevent excessive door closing speeds.

BACKGROUND

There exist numerous configurations for aircraft fuselage doors. The embodiments disclosed herein are especially useful for in combination with so-called aircraft "plug-in" doors. For this type of door to open, it must necessarily move upwardly guided by a rail system. Taking into account the weight of the door, some form of a counterbalancing system is necessary in order to assist the opening and closing operations of a plug-in door. Of the possible counterbalance systems typically available, for example, electric, hydraulic or mechanical systems, the mechanical counterbalance systems possess the lowest cost, weight and complexity.

Mechanical systems currently found are used to provide some or nearly all of the energy needed to lift the door by means of helical torsion springs, made of metal or composite material (see U.S. Pat. Nos. 5,735,020, 4,047,441 and 3,585,757, the entire content of each being expressly incorporated hereinto be reference), or also through helical compression springs (see U.S. Pat. No. 9,033,277, the entire content of which is expressly incorporated hereinto by reference), which uses a compression spring cartridge for counterbalancing the door. However, in all options found, none proposes the use of a torsion bar spring to store energy. In addition, for those proposals which include integrated helical torsion springs (i.e., U.S. Pat. Nos. 5,735,020, 4,047,441 and 3,585,757), the volume of the systems occupy a significant internal space of the aircraft. Moreover, one can infer that the reel and support for these helical torsion springs have a significant weight.

What has been needed in the art, therefore is a counterbalance mechanism for upwardly opening aircraft "plug-in" doors that is of reduced weight and volume so as to be useable in aircraft with smaller available internal space. It is towards fulfilling such a need that the embodiments disclosed herein are directed.

SUMMARY

In general, the counterbalance assemblies as disclosed herein include a torsion bar spring for counter-balancing the weight of upwardly opening aircraft doors for ease of opening and closing. The torsion bar spring may be linked to the aircraft door through an integrated gear reduction system comprised of two pairs of spur gears and respective shafts as well as a linkage assembly. A cable reel is connected to the output shaft and the input shaft is connected to a four bar linkage attached to the end of the torsion bar. The cable reel stores the lift cable and provides the output torque to lift the aircraft door. When the aircraft door opens or closes, the center of mass loses or gains height respectively, causing a variation of gravitational potential energy. In such a manner, the gravitational potential energy is exchanged with strain elastic energy from the counter-balance spring therefore reducing the required external source of energy whether it is from a power assisted means or manual operation. For doors that slide upwardly, guided by a track system, the strain energy of the counter balance system is transferred to the door to increase its potential energy when the door opens.

According to one embodiment, the counterbalance assembly will include a rotatable cable reel having a length of lifting cable with an end thereof being attached to the aircraft door and a torsion bar supported by the aircraft fuselage having proximal and distal ends constrained against rotational movement about an elongate axis of the torsion bar. A gear reduction system is operatively connected to the cable reel so as to receive a rotational input from the cable reel in response to lifting or closing movement of the door and generate a rotational output that is less than the rotational output while a linkage system operatively interconnecting the gear reduction system and the proximal end of the torsion bar. The torsion bar will be in a state of increased (maximum) torque thereby generating high (maximum) torsional spring force when the door is in the closed position thereof such that rotation of the cable reel when the door is lifted into the opened position thereof drives the gear reduction system and move the linkage system to responsively cause the torsional spring force generated by the torsion bar to unload thereby counterbalancing the door weight.

The distal end of the torsion bar may include a notch which is received within a support sleeve fixed to the aircraft fuselage in a male/female connection so as to restrain the torsion bar against rotational movement about the elongate axis thereof. The support sleeve may thus be connected to the distal end of the torsion bar so as to allow longitudinal movement between the support sleeve and the distal end of the torsion bar along the longitudinal axis thereof.

According to some embodiments, the cable reel may comprise a pinion gear while the linkage system may comprise a sector gear. The reduction gear system may therefore include a pair of reduction gears intermeshed between the pinion gear and the sector gear so as to receive the rotational input from the cable reel and generate the lesser rotational output.

The linkage system may be provided with first and second separated guided lever and driving lever links and a coupler linkage rod which interconnects the guided lever and driving lever links. The guided lever link may therefore be fixed to the sector gear while the driving lever link may be fixed to the proximal end of the torsion bar such that the lesser rotational output of the reduction gear system is transferred to the proximal end of the torsional bar.

These and other aspects and advantages of the present invention will become more clear after careful consideration is given to the following detailed description of the preferred exemplary embodiments thereof.

BRIEF DESCRIPTION OF ACCOMPANYING DRAWINGS

The disclosed embodiments of the present invention will be better and more completely understood by referring to the following detailed description of exemplary non-limiting illustrative embodiments in conjunction with the drawings of which:

FIGS. 5A-5C depict detailed views of the torsion bar employed in the counterbalance assembly where

DETAILED DESCRIPTION

Figure 1A:
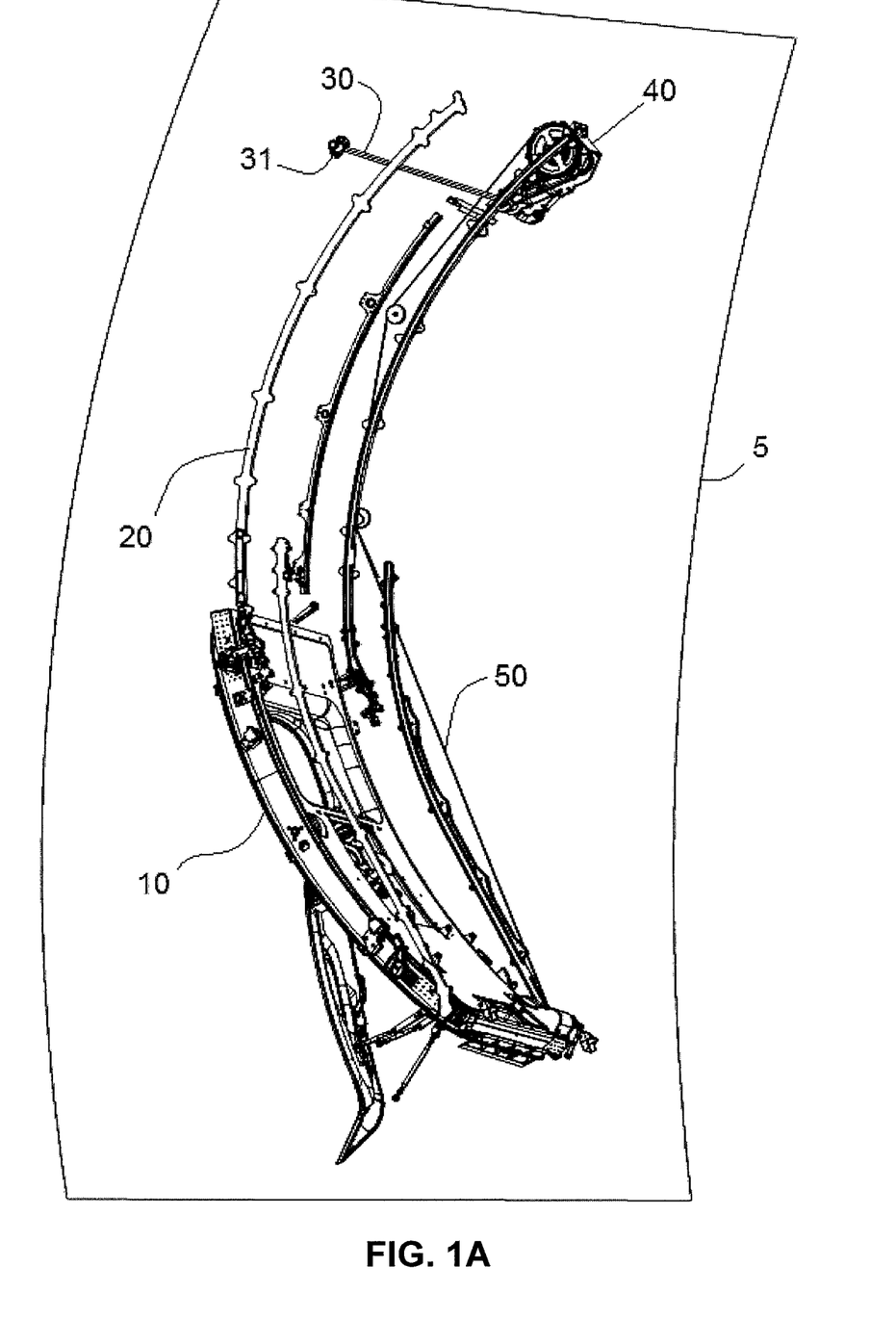
FIGS. 1A and 1B are perspective views from an interior of an aircraft fuselage showing the upwardly opening fuselage door in closed and opened positions, respectively, which is aided by a counterbalancing assembly in accordance with an embodiment of the invention herein.
Figure 1B:
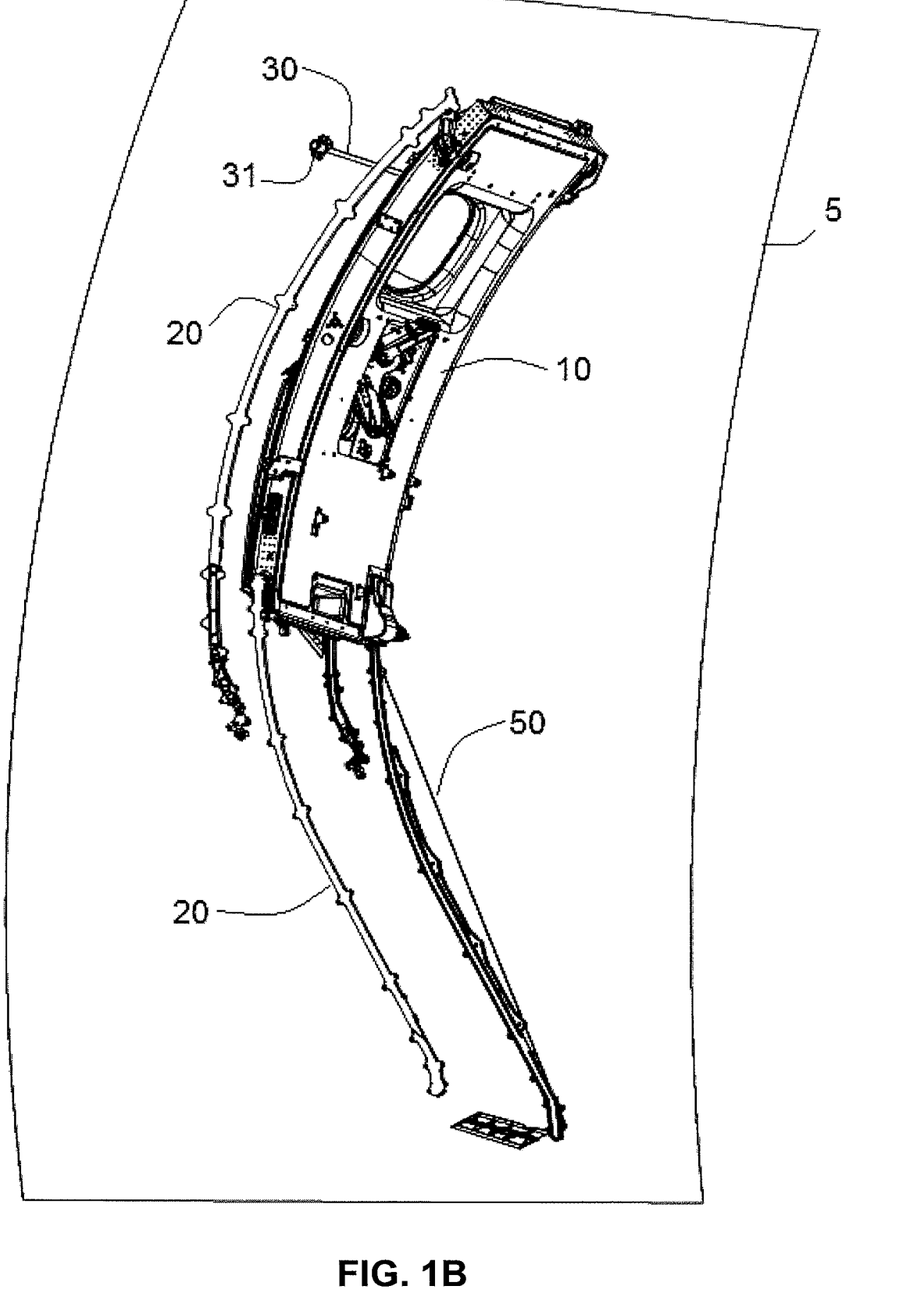
Figure 2:
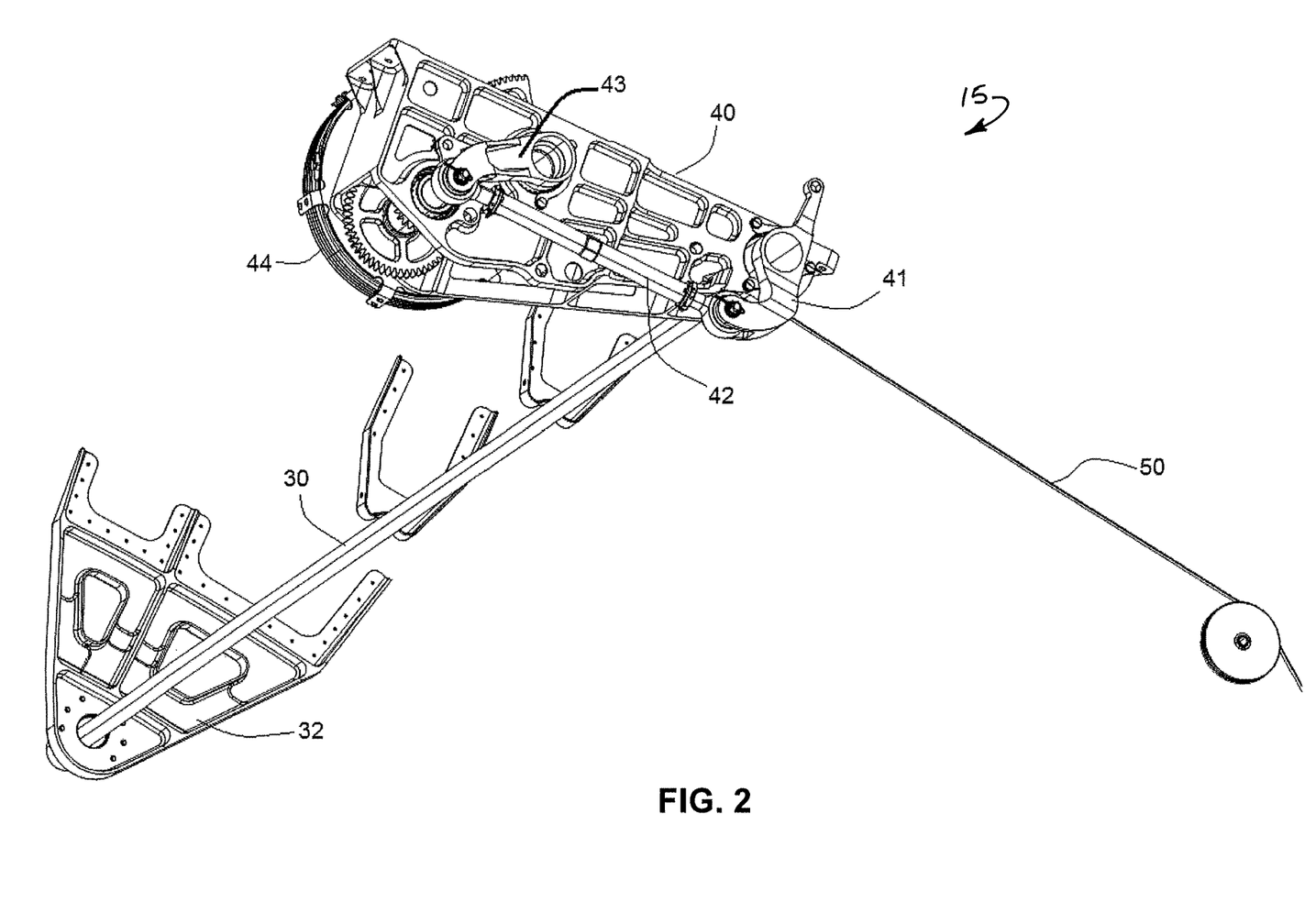
FIG. 2 is an enlarged view of the counterbalancing assembly in a state with the aircraft door in the closed position as depicted in FIG. 1A.
Figure 3:
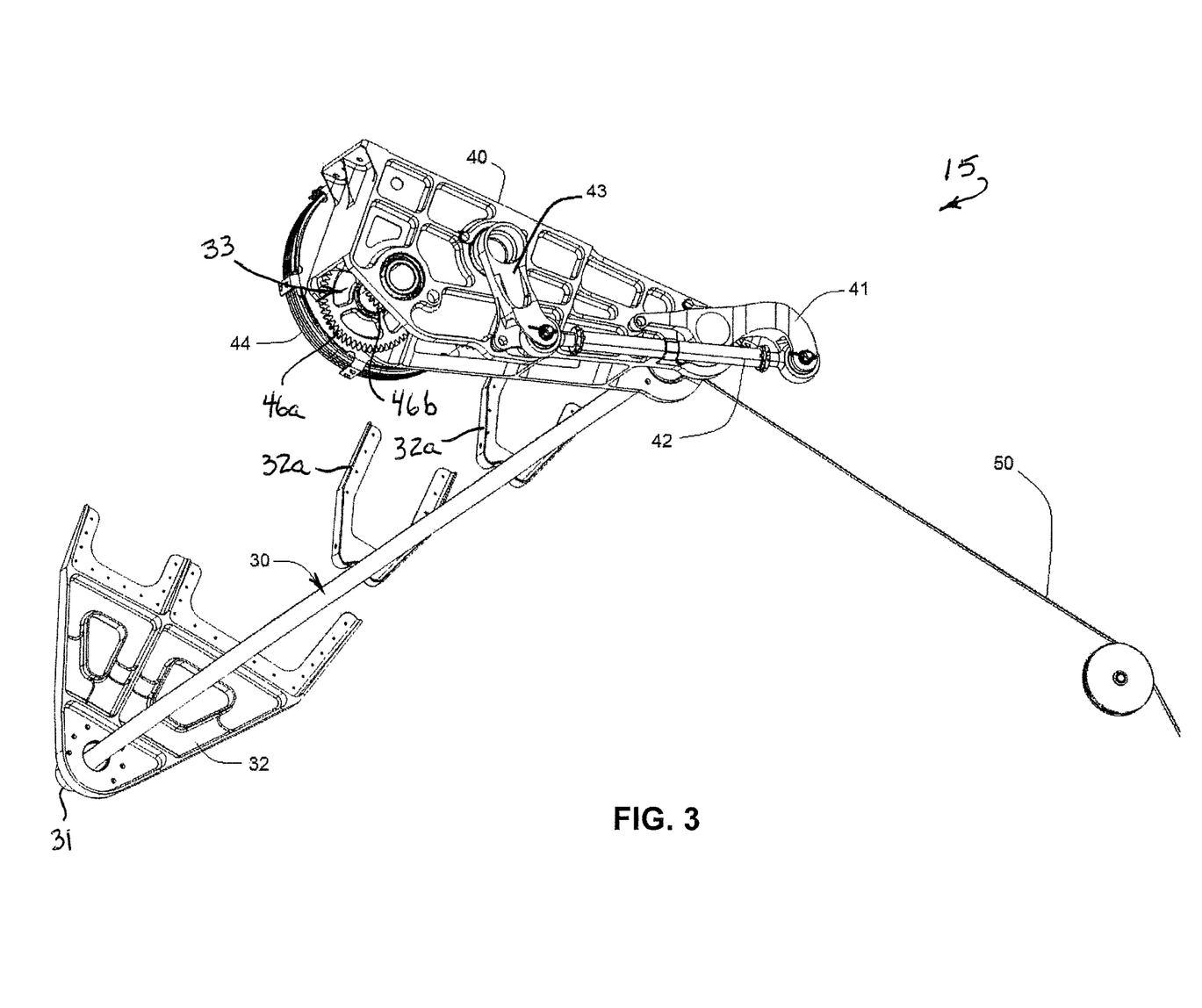
FIG. 3 is an enlarged view of the counterbalancing assembly in a state with the aircraft door in the opened position as depicted in FIG. 1B.

Accompanying FIGS. 1A and 1B depict a typical upwardly opening plug-in door 10 operatively associated with an aircraft fuselage so as to allow an opening in the fuselage (schematically depicted in FIGS. 1A and 1B by reference numeral 5) to be closed (FIG. 1A) and opened (FIG. 1B). As shown, the door 10 is moved inwardly and upwardly guided along the guide tracks 20. In accordance with the embodiments disclosed herein, the door is provided with a counterbalance assembly 15 which includes a torsion bar spring 30 for energy storage (counterbalance spring) connected through a four bar linkage system to a gear reduction box 40 having an output cable reel 44 linked to the door 10 by a stainless steel cable 50. The torsion bar 30 provides a very compact dimensional envelope with a main dimension (length) being compatible with the longitudinal dimension of the fuselage 5. As such, the torsion bar 30 can be aligned with the structural panels of the fuselage 5 and supported by a primary bracket 32 and intermediate brackets 32a fixed to the fuselage frame (see FIGS. 2 and 3).

A principal objective of the counterbalancing assembly 15 for the aircraft door 10 according to the embodiment disclosed herein is to supply the necessary energy demand to position the door 10 in the fully open position as shown in FIG. 1B, guided by the guide tracks 20, and also assist in preventing the door 10 from gaining movement speed during its descent toward the closed position as shown in FIG. 1A. The door 10 in the open position (FIG. 1B) will have the maximum gravitational potential energy such that the mechanical system of the counterbalancing assembly 15 will counterbalance using the elastic strain energy of the torsion bar spring 30.

Figure 4:
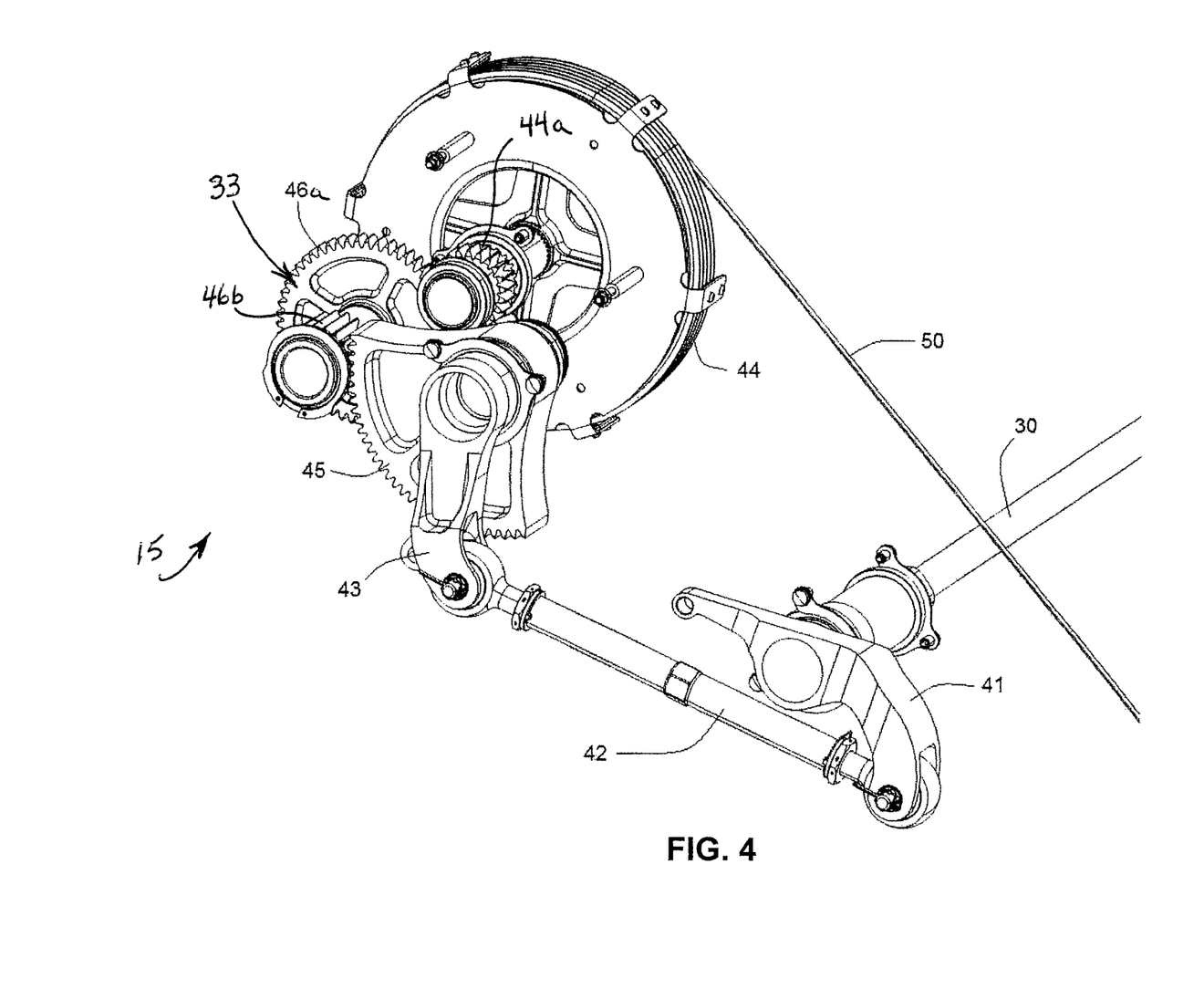
FIG. 4 is a detailed perspective view of the four bar mechanism employed in the counterbalance assembly depicted in FIGS. 2 and 3.

The mechanical architecture of the door counterbalancing assembly 15 according to the embodiment described herein is generally comprised of three main components, specifically the lifting cable 50, the gear reduction box 40, and the torsion bar 30. The gear reduction box 40 contains three transmission elements, specifically reel 44 carrying a pinion gear 44a, reduction gears 45, 46 and a four bar linkage system comprised of separated guided lever and driving lever links 41, 43, respectively, which are operatively connected to one another by a coupler linkage rod 42. The four bar linkage system provided by the guided lever and driving lever links 41, 43, respectively, and the linkage rod 42 serve to transmit the motion of torsion bar 30 to the hoisting cable 50 (see FIGS. 2-4).

Figure 5A:
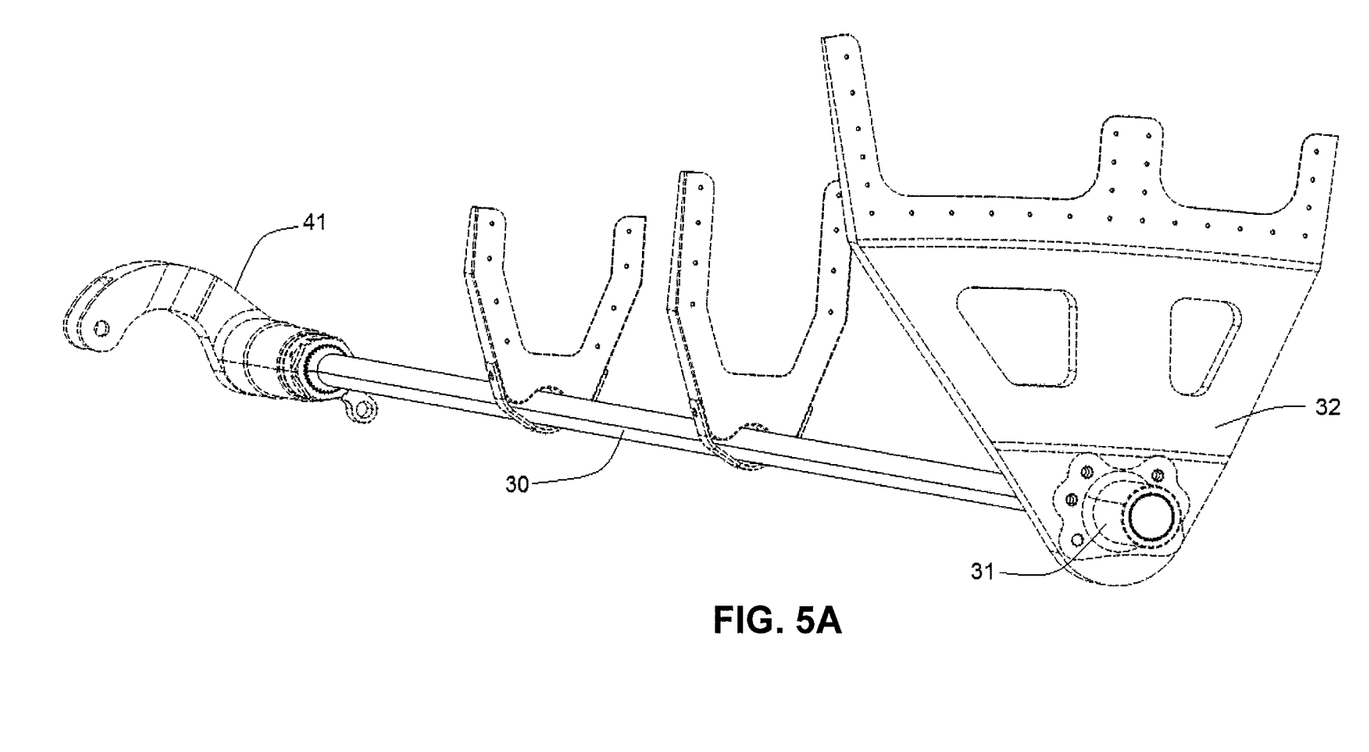
FIG. 5A shows the mounting of the torsion bar to the support sleeves for rotational restraint at each of its proximal and distal ends.
Figure 5B:
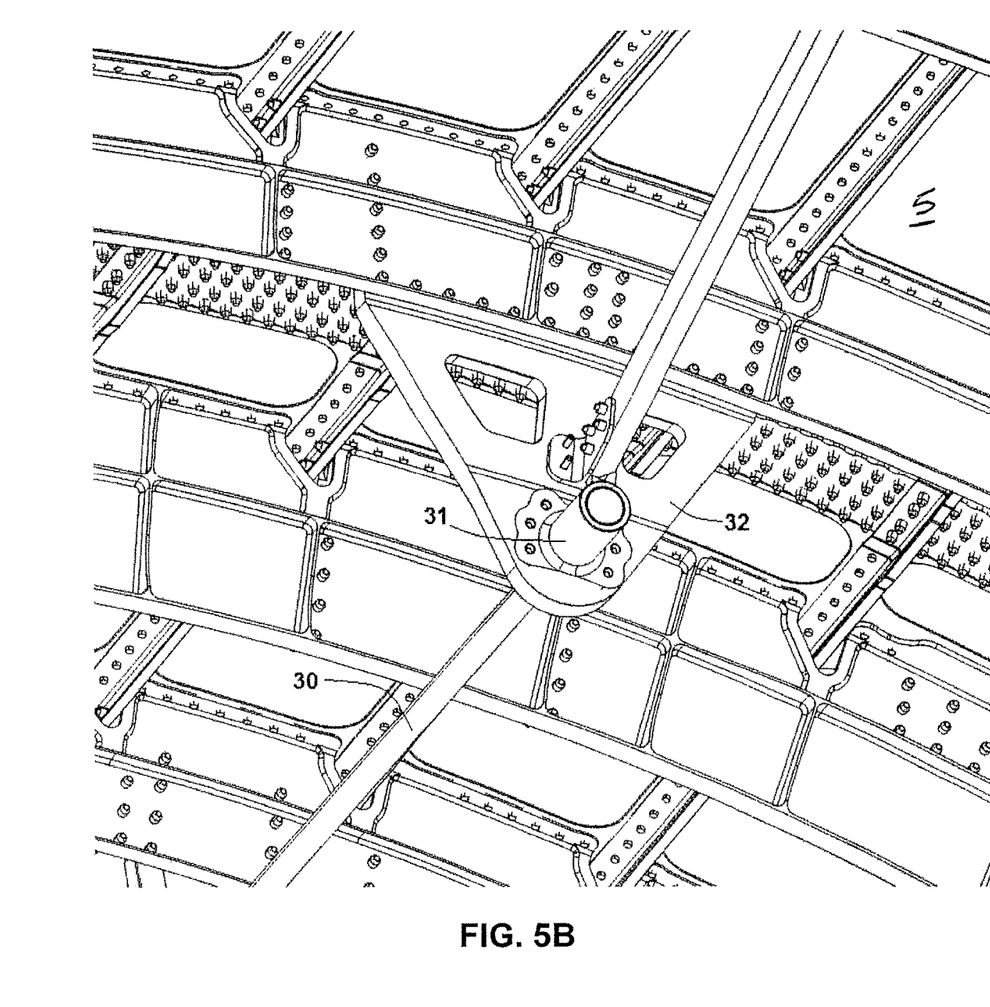
FIG. 5B is a perspective view of the distal end of the torsion bar that is attached to its associated support sleeve which is in turn attached to a support bracket fixed to the aircraft fuselage structure.

A distal end of the torsion bar 30 opposite to the gear reduction box 40 is inserted into a support sleeve 31 fixed to the structure of the fuselage 5 by a bracket 32 (see FIG. 5A). The torsion bar 30 is provided with an external involute spline (not shown) which mates with a conformingly configured internal involute spline recess (not shown) within the support sleeve 31 in a male/female type connection. This structural connection between the distal end of the torsion bar 30 and the support sleeve 31 thereby constrains the distal end of the torsion bar against rotational motion about the elongate axis of the bar 30 while allowing the distal end of the bar 30 to be moved longitudinally along the elongate axis thereof. This rotational constraint and longitudinal play provided between the distal end of the torsion bar 30 and the support sleeve 31 thereby allows the torsion bar to be torqued about its elongate axis during use and accommodate any longitudinal movement that may occur due to such torque.

Figure 5C:
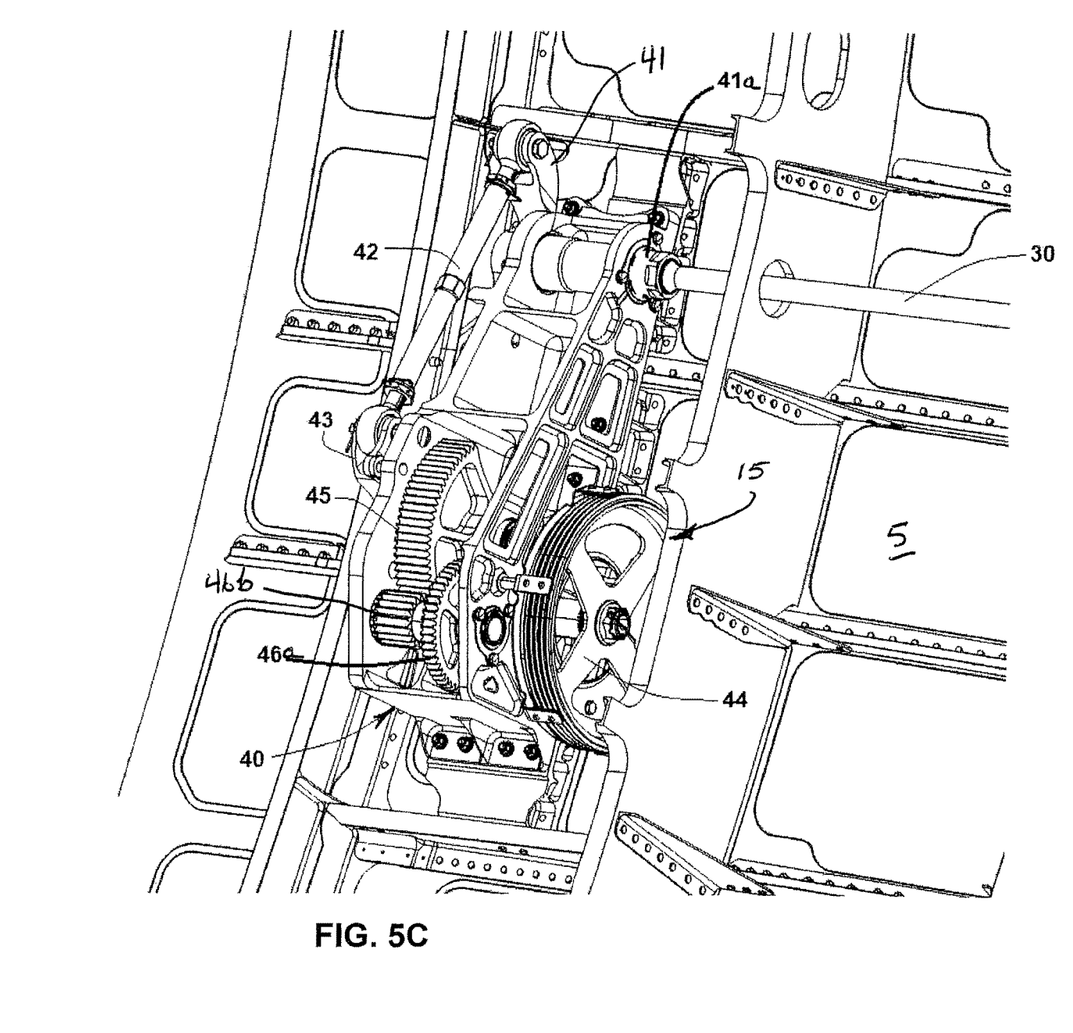
FIG. 5C is a perspective view showing the coupling of the proximal end of the torsion bar to the linkage system.

The opposite proximal end of the torsion bar 30 also receives the external involute spline (not shown) in a male/female connection type at a connection sleeve 41a associated with the guided lever link 41 within the gear reduction box 40. The connection at the proximal end of the torsion bar 30 to the connection sleeve 41a is such that the involute spline thereof is immovably inserted into and thereby positionally fixed to the guided lever link 41 in such a way as to prevent longitudinal movement therebetween such that the guided lever link 41 and the proximal end of the torsion bar 30 may be pivoted about the elongate axis of the bar 30 as a unit. It will be appreciated therefore that pivoting of the proximal end of the torsion bar 30 by the guided lever link 41 while the distal end of the bar 30 remains positionally fixed against pivotal movement by its connection to the support sleeve 31 will cause the bar 30 to be torqued between such ends thereby generating torsional spring force in a direction opposite to the torque.

Figure 6:
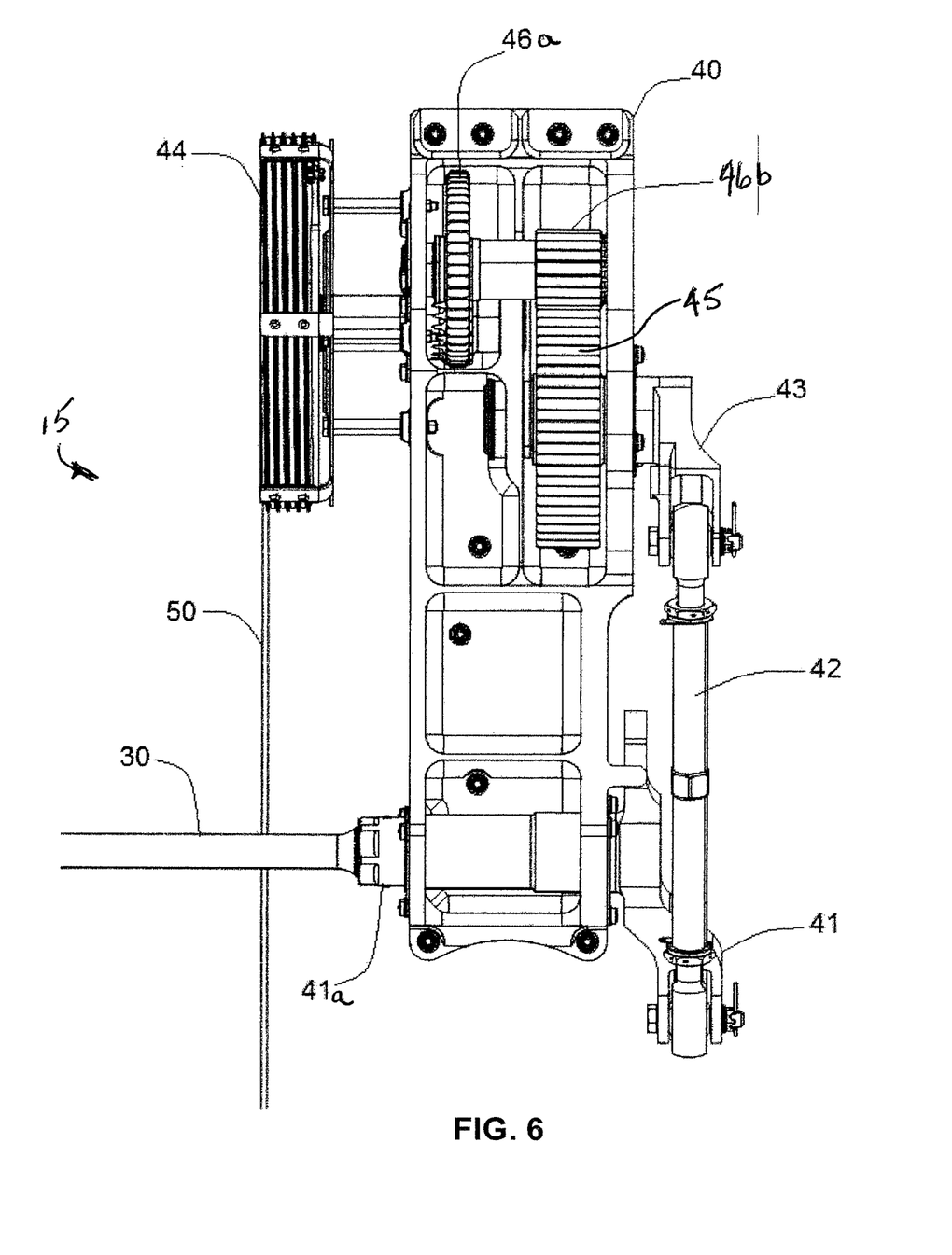
FIG. 6 is a detailed elevation view showing the reduction system associated with the counterbalance assembly.

Due to the constrained angle of the torsion bar 30 as compared to the number of turns of the reel 44 necessary to lift the door 10, the counterbalance assembly 15 includes a gear reduction system 33 comprised of sector gears 45 operatively connected to a pair of reduction spur gears 46a, 46b (see FIG. 6) to amplify the relatively small angular displacement of the torsion bar 30 when torqued into rotational turns of the reel 44. The specific gear reduction ratio that is required for a specific installation of the embodiment described herein will depend upon the size of the door, the diameter of the reel 44 and the number of turns required to wind the support cable 50 onto the circumference of the reel 44 so as to raise the door 10 to the fully open position. Thus, one (or more) gear reduction systems 33 may be required in order to achieve the desired gear reduction ratio. For most plug-in doors currently available, it is envisioned that the gear reduction ratio achieved by the gear reduction system 33 will be between about 10:1 to about 15:1, e.g., about 11.7:1.

The gear reduction box 40 physically accommodates the reduction gear system 33 and also the reel 44 for the door support cable 50. Due to its location within aircraft fuselage 5, it is important the diameter of the cable reel 44 not be too large so as to affect the cargo envelope within the fuselage 5. The cable reel diameter 44 may, for example, be between about 150 mm to about 250 mm, e.g., about 210 mm.

The gears 45, 46a and 46b engage one another with a profile developed for the operation of lifting and closing the door 10. That is, when the door 10 is in the closed position (FIG. 1A), the maximum elastic strain energy (i.e., the torsion bar 30 will be in a position of maximum torque) will be experienced by the gear teeth of the gear reduction system 33. When the door 10 is in the open position, the elastic strain energy is minimal (i.e., since the torsion bar 30 is at a position of minimum torque). In such a manner, therefore, the teeth of the gears 45, 46a and 46b associated with the gear reduction system 33 will for the most part be subjected to loads (maximum tension) because the aircraft door 10 is in a closed position most of the time. Due to this, the engaging tooth profile is designed with the objective of working under a permissible maximum tension that enables the maximum fatigue life with minimum friction as possible between the teeth.

In use, the cable reel 44 will be caused to rotate about its rotational axis so as to retrieve the cable 50 while the door 10 is in transit along the guide tracks 20 from its closed position (FIG. 1A) to the opened position (FIG. 1B). Rotation of the cable reel 44 may be caused by manually lifting of the door 10 or by means of conventional electrical and/or hydraulic motive systems (not shown). As noted previously, the torsion bar 30 is in a state of increased (maximum) torque when the door 10 is in its closed position thereby exerting a high (maximum) torsional spring force on the reduction gear system 33. Rotation of the cable reel 44 during movement of the door 10 in the direction of its opened position will in turn rotate the pinion gear 44a thereby causing the gear reduction system 33 to operate and rotationally drive the driving lever link 43 about its rotational axis. The driving lever link 43 will thereby drive the guided lever link 41 in the same rotational direction by virtue of the interconnection provided by way of the linkage rod 42. Since the guided lever link 41 is fixed to the proximal end of the torsion bar by means of support sleeve 41a and since the distal end of the torsion bar 30 is rotationally restrained by the support sleeve 31, the torsion bar 30 will be twisted or torqued between its proximal and distal ends thereby loading the torsion bar with a maximum torsional spring force when the door 10 is in its closed position. The magnitude of this torsional spring force will therefore be proportionally released while the door 10 moves upwardly into its raised position by virtue of the rotational movement of the guided lever link 41 and its support sleeve 41a. Such torsional spring force of the torsion bar 30 thus proportionally counterbalances the weight of the door 10 during its movement from the closed position to the opened position thereof and thereby provide lift assistance to the door 10 when moved into its opened position. When it is desired to close the door 10, however, the rotational movement of the reel 44 will responsively cause the torsion bar 30 to be re-torqued by virtue of the gear reduction system 33 and the linkages 41, 42 and 43 which thereby again counterbalances the weight of the door 10 to prevent an unsafe increase of closing speed of the door 10.

Example

Equations 1 and 2 below are the basic formulas of physics used for the initial dimensioning of the torsion bar 30. Because of the complexity of the motion equations the relational height coordinate and angle bar are omitted.

Basic Equations $$E_g = mg\Delta z \qquad \text{(1) Gravitational potential energy}$$

$$E_{k\theta} = \tfrac{1}{2} k_\theta \theta^2 \qquad \text{(2) Elastic potential energy}$$

Figure 7:
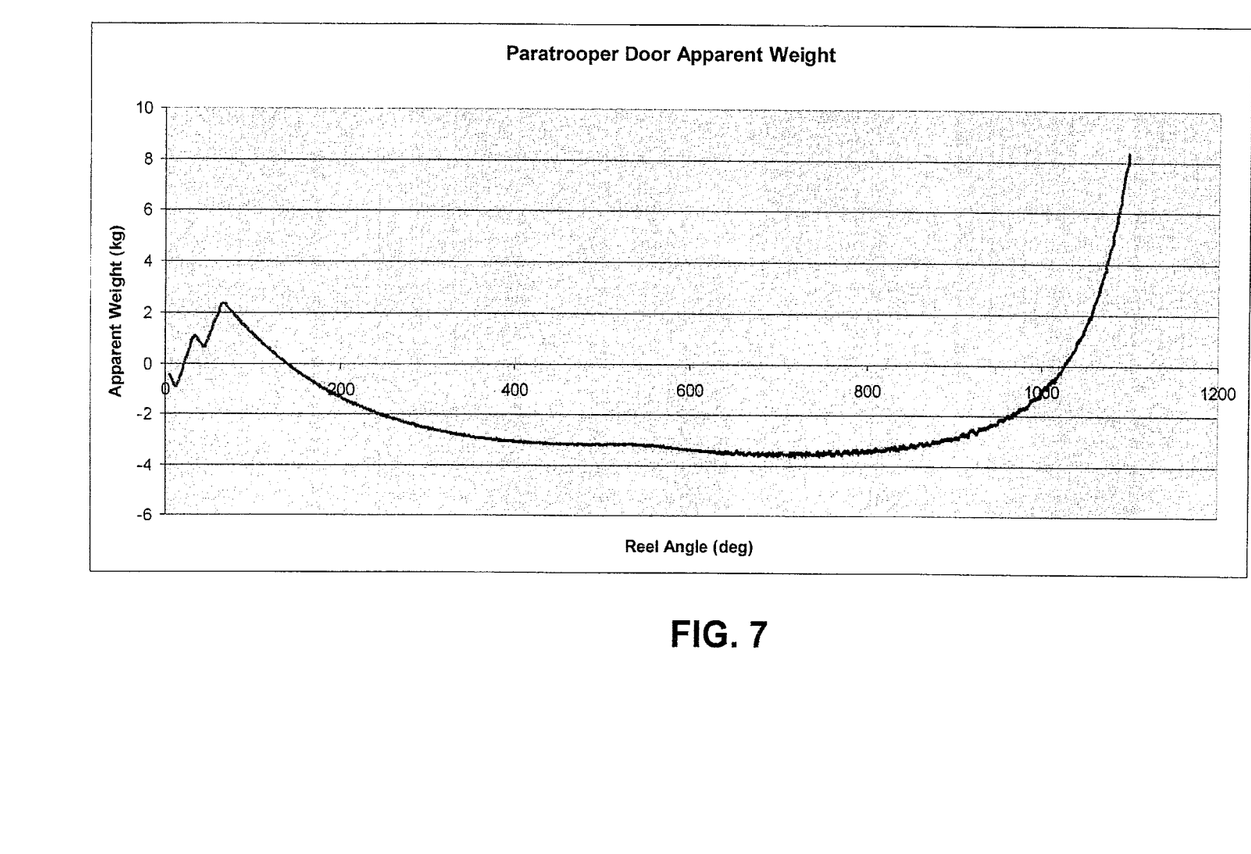
FIG. 7 is a graph of apparent door weight (kg) versus reel angle (degrees) using the embodiment of a counterbalance assembly as disclosed herein.

The balanced behavior of the door 10 according to the embodiment described herein is shown in FIG. 7. The actual weight of the door 10 according to this Example is approximately 94 kg and the apparent weight while balanced is a maximum of 8 kg at the end of the door elevation.

The difference between the heights of the center of gravity of the door 10 from the closed position to the open position is approximately 2 meters. The value of gravitational and elastic potential energy can be determined by Equations (1) and (2) below:

$$E_g = mg\Delta z = 94 \times 9.81 \times 2.0 \cong 1845 \text{ Joules} \qquad (1)$$

$$E_{k\theta} = \frac{1}{2}\frac{GJ}{L}\theta^2 = \frac{1}{2} \times 650 \times \left(\left(\frac{135}{180} \times \pi\right)^2 - \left(\frac{21}{180} \times \pi\right)^2\right) \cong 1760 \text{ Joules} \qquad (2)$$

It can be seen that the door 10 is almost fully balanced (95%), not considering the hysteresis effects due to friction.

System efficiency will be higher, the better the coupling between the gravitational potential energy curves with the elastic deformation energy. The graph in FIG. 8 below shows the gravitational potential energy curves (dark line curve) and the elastic deformation energy curve (light line curve) of the embodiment of the counterbalance assembly disclosed herein, where the abscissa represents the reel 44 turning angle in degrees and the ordinate axis represents the moment on the reel 44 in daN·mm.

Figure 8:
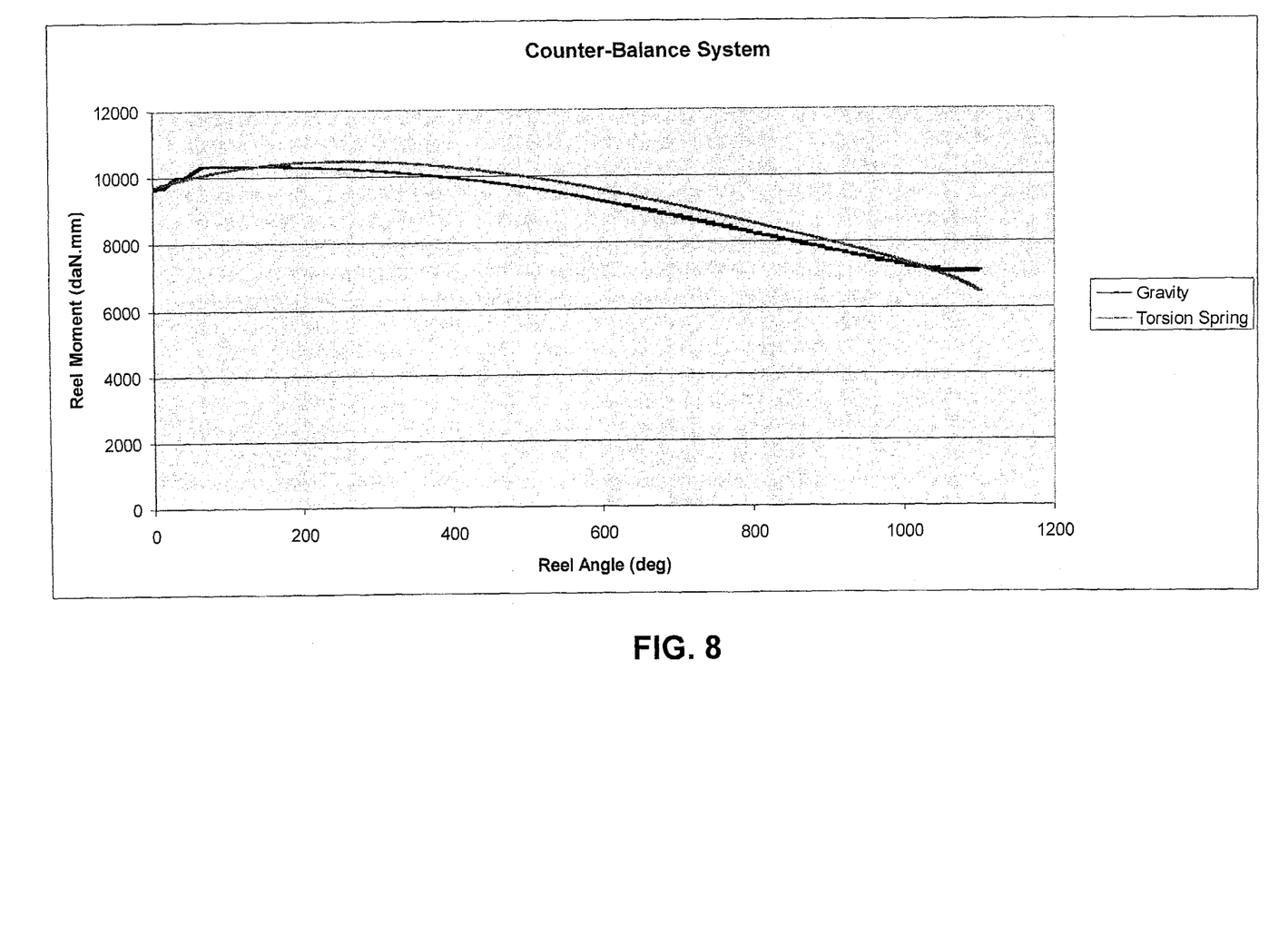
FIG. 8 is a graph show the gravitational potential energy curve and the elastic deformation energy curve of a counterbalance assembly in accordance with the embodiment described herein, where the abscissa represents the reel turning angle in degrees and the ordinate axis represents the moment (daN·mm) on the reel.

The four bar linkage system comprised of linkages 41, 42 and 43 creates a ratio between the torsion bar 30 and the reel 44 of the cable 50 that plays a key role in coupling the curves shown in FIG. 8 thereby allowing the door 10 to be balanced throughout its path of opening and closing. The gears 45 and 46 together with the reel 44 allow the torsion angle of the bar 30 to be repeatedly amplified in such a way that the cable 50 can be fully wound upon the reel 44 while lifting the door 10.

Another important point that helps the coupling of the curves on the graph of FIG. 8 is the pre-torque in the torsion bar 30, where the bar is stressed thereby contributing to the coupling of the curves. In addition, pre-torque of the torsion bar 30 also has the advantage of providing energy in order for the door 10 to open by keeping the support cable 50 tensioned and holding the door 10 against the limit stop. The drawback of the pre-torque power that is supplied to the system is that it represents wasted energy when the door 10 is at an initial (V0) position. The four bar linkage system as described previously is such that the amount of pre-torque from the torsion bar to hold the door opened is minimized.

Various modifications within the skill of those in the art may be envisioned. Therefore, while the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope thereof.

What is claimed is:

1. A counterbalance assembly to counterbalance weight of an upwardly opening aircraft door which is movable between closed and opened positions so as to close and open an opening associated with an aircraft fuselage, respectively, wherein the counterbalance assembly comprises:
   a rotatable cable reel which includes a length of lifting cable having an end attached to the aircraft door;
   a torsion bar supported by the aircraft fuselage having proximal and distal ends constrained against rotational movement about an elongate axis of the torsion bar;
   a gear reduction system operatively connected to the cable reel so as to receive a rotational input from the cable reel in response to lifting or closing movement of the door and generate a lesser rotational output; and
   a linkage system operatively interconnecting the gear reduction system and the proximal end of the torsion bar, wherein
   the distal end of the torsion bar includes a notch which is received within a support sleeve fixed to the aircraft fuselage in a male/female connection so as to restrain the torsion bar against rotational movement about the elongate axis thereof, and wherein
   the support sleeve is connected to the distal end of the torsion bar so as to allow longitudinal movement between the support sleeve and the distal end of the torsion bar along the longitudinal axis thereof, and wherein
   the torsion bar is in a state of increased torque thereby generating high torsional spring force when the door is in the closed position thereof such that rotation of the cable reel when the door is lifted into the opened position thereof drives the gear reduction system and moves the linkage system to responsively cause the torsional spring force generated by the torsion bar to unload thereby counterbalancing the door weight.

2. The counterbalance assembly as in claim 1, wherein the cable reel comprises a pinion gear;
   the linkage system comprises a sector gear, and
   the reduction gear system includes a pair of reduction gears intermeshed between the pinion gear and the sector gear so as to receive the rotational input from the cable reel and generate the lesser rotational output.

3. The counterbalance assembly as in claim 2, wherein the linkage system comprises a guided lever link, a driving lever link and a coupler linkage rod interconnecting the guided lever and driving lever links, and wherein
   the guided lever link is fixed to the sector gear and the driving lever link is fixed to the proximal end of the torsion bar such that the lesser rotational output of the reduction gear system is transferred to the proximal end of the torsion bar.

4. The counterbalance assembly as in claim 2, wherein the linkage system comprises a guided lever link, a driving lever link and a coupler linkage rod interconnecting the guided lever and driving lever links, and wherein
   the guided lever link is fixed to the sector gear and the driving lever link is fixed to the proximal end of the torsion bar such that the lesser rotational output of the gear reduction system is transferred to the proximal end of the torsion bar.

5. The counterbalance assembly as in claim 1, wherein the cable reel comprises a pinion gear;
   the linkage system comprises a sector gear, and
   the reduction gear system includes a pair of reduction gears intermeshed between the pinion gear and the sector gear so as to receive the rotational input from the cable reel and generate the lesser rotational output.

6. The counterbalance assembly as in claim 1, wherein the linkage system comprises a guided lever link, a driving lever link and a coupler linkage rod which interconnects the guided lever and driving lever links.

7. The counterbalance assembly as in claim 6, wherein the linkage system comprises a sector gear operatively connected to the gear reduction system and fixed to the guided lever link.

8. The counterbalance assembly as in claim 7, wherein the cable reel comprises a pinion gear and the reduction gear system comprises a pair of reduction gears intermeshed between the pinion gear and the sector gear so as to receive the rotational input from the cable reel and generate the lesser rotational output.

9. The counterbalance assembly as in claim 7, wherein the driving lever link is fixed to the proximal end of the torsion bar such that the lesser rotational output of the gear reduction system is transferred to the proximal end of the torsion bar.

10. An aircraft comprising:
    a fuselage;
    an opening in the fuselage;
    an aircraft door which is moveable upwardly relative to the opening in the fuselage between closed and opened positions so as to close and open the opening in the aircraft fuselage, respectively; and
    a counterbalance assembly to counterbalance the aircraft door when moved between the closed and opened positions thereof, wherein the counterbalance assembly comprises:
    (i) a rotatable cable reel which includes a length of lifting cable having an end attached to the aircraft door;
    (ii) a torsion bar supported by the aircraft fuselage having proximal and distal ends constrained against rotational movement about an elongate axis of the torsion bar;
    (iii) a gear reduction system operatively connected to the cable reel so as to receive a rotational input from the cable reel in response to lifting or closing movement of the door and generate a lesser rotational output; and
    (iv) a linkage system operatively interconnecting the gear reduction system and the proximal end of the torsion bar, wherein
    the distal end of the torsion bar includes a notch which is received within a support sleeve fixed to the aircraft fuselage in a male/female connection so as to restrain the torsion bar against rotational movement about the elongate axis thereof, and wherein
    the support sleeve is connected to the distal end of the torsion bar so as to allow longitudinal movement between the support sleeve and the distal end of the torsion bar along the longitudinal axis thereof, and wherein
    the torsion bar is in a state of increased torque thereby generating high torsional spring force when the door is in the closed position thereof such that rotation of the cable reel when the door is lifted into the opened position thereof drives the gear reduction system and move the linkage system to responsively cause the torsional spring force generated by the torsion bar to unload thereby counterbalancing the door weight.

11. The aircraft as in claim 10, wherein
    the cable reel comprises a pinion gear;
    the linkage system comprises a sector gear, and
    the reduction gear system includes a pair of reduction gears intermeshed between the pinion gear and the sector gear so as to receive the rotational input from the cable reel and generate the lesser rotational output.

12. The aircraft as in claim 11, wherein
the linkage system comprises a guided lever link, a driving lever link, and a coupler linkage rod which interconnects the guided lever and driving lever links, and wherein
the guided lever link is fixed to the sector gear and the driving lever link is fixed to the proximal end of the torsion bar such that the lesser rotational output of the reduction gear system is transferred to the proximal end of the torsion bar.

13. The aircraft as in claim 10, wherein
the cable reel comprises a pinion gear;
the linkage system comprises a sector gear, and
the reduction gear system includes a pair of reduction gears intermeshed between the pinion gear and the sector gear so as to receive the rotational input from the cable reel and generate the lesser rotational output.

14. The aircraft as in claim 13, wherein
the linkage system comprises a guided lever link, a driving lever link and a coupler linkage rod which interconnects the guided lever and driving lever links, and wherein
the guided lever link is fixed to the sector gear and the driving lever link is fixed to the proximal end of the torsion bar such that the lesser rotational output of the gear reduction system is transferred to the proximal end of the torsion bar.

15. The aircraft as in claim 10, wherein the linkage system comprises a guided lever link, a driving lever link and a linkage rod which interconnects the guided lever and driving lever links.

16. The aircraft as in claim 15, wherein the linkage system comprises a sector gear operatively connected to the gear reduction system and fixed to the guided lever link.

17. The aircraft as in claim 16, wherein the cable reel comprises a pinion gear and the reduction gear system comprises a pair of reduction gears intermeshed between the pinion gear and the sector gear so as to receive the rotational input from the cable reel and generate the lesser rotational output.

18. The aircraft as in claim 16, wherein the driving lever link is fixed to the proximal end of the torsion bar such that the lesser rotational output of the gear reduction system is transferred to the proximal end of the torsion bar.

19. A counterbalance assembly to counterbalance weight of an upwardly opening aircraft door which is movable between closed and opened positions so as to close and open an opening associated with an aircraft fuselage, respectively, wherein the counterbalance assembly comprises:
a rotatable cable reel which includes a length of lifting cable having an end attached to the aircraft door;
a torsion bar supported by the aircraft fuselage having proximal and distal ends constrained against rotational movement about an elongate axis of the torsion bar;
a gear reduction system operatively connected to the cable reel so as to receive a rotational input from the cable reel in response to lifting or closing movement of the door and generate a lesser rotational output; and
a linkage system operatively interconnecting the gear reduction system and the proximal end of the torsion bar, wherein
the linkage system comprises a guided lever link, a driving lever link and a coupler linkage rod which interconnects the guided lever and driving lever links, wherein
the torsion bar is in a state of increased torque thereby generating high torsional spring force when the door is in the closed position thereof such that rotation of the cable reel when the door is lifted into the opened position thereof drives the gear reduction system and moves the linkage system to responsively cause the torsional spring force generated by the torsion bar to unload thereby counterbalancing the door weight.

20. The counterbalance assembly as in claim 19, wherein the linkage system comprises a sector gear operatively connected to the gear reduction system and fixed to the guided lever link.

21. The counterbalance assembly as in claim 20, wherein the cable reel comprises a pinion gear and the reduction gear system comprises a pair of reduction gears intermeshed between the pinion gear and the sector gear so as to receive the rotational input from the cable reel and generate the lesser rotational output.

22. The counterbalance assembly as in claim 20, wherein the driving lever link is fixed to the proximal end of the torsion bar such that the lesser rotational output of the gear reduction system is transferred to the proximal end of the torsional bar.

23. An aircraft comprising:
a fuselage;
an opening in the fuselage;
an aircraft door which is moveable upwardly relative to the opening in the fuselage between closed and opened positions so as to close and open the opening in the aircraft fuselage, respectively; and
a counterbalance assembly to counterbalance the aircraft door when moved between the closed and opened positions thereof, wherein the counterbalance assembly comprises:
(i) a rotatable cable reel which includes a length of lifting cable having an end attached to the aircraft door;
(ii) a torsion bar supported by the aircraft fuselage having proximal and distal ends constrained against rotational movement about an elongate axis of the torsion bar;
(iii) a gear reduction system operatively connected to the cable reel so as to receive a rotational input from the cable reel in response to lifting or closing movement of the door and generate a lesser rotational output; and
(iv) a linkage system operatively interconnecting the gear reduction system and the proximal end of the torsion bar, wherein
the linkage system comprises a guided lever link, a driving lever link and a linkage rod which interconnects the guided lever and driving lever links, and wherein
the torsion bar is in a state of increased torque thereby generating high torsional spring force when the door is in the closed position thereof such that rotation of the cable reel when the door is lifted into the opened position thereof drives the gear reduction system and move the linkage system to responsively cause the torsional spring force generated by the torsion bar to unload thereby counterbalancing the door weight.

24. The aircraft as in claim 23, wherein
the cable reel comprises a pinion gear;
the linkage system comprises a sector gear, and
the reduction gear system includes a pair of reduction gears intermeshed between the pinion gear and the sector gear so as to receive the rotational input from the cable reel and generate the lesser rotational output.

25. The aircraft as in claim 24, wherein
the guided lever link is fixed to the sector gear and the driving lever link is fixed to the proximal end of the torsion bar such that the lesser rotational output of the reduction gear system is transferred to the proximal end of the torsion bar.

26. The aircraft as in claim 23, wherein
the cable reel comprises a pinion gear;
the linkage system comprises a sector gear, and
the reduction gear system includes a pair of reduction gears intermeshed between the pinion gear and the sector gear so as to receive the rotational input from the cable reel and generate the lesser rotational output.

27. The aircraft as in claim 26, wherein
the linkage system comprises a guided lever link, a driving lever link and a coupler linkage rod which interconnects the guided lever and driving lever links, and wherein
the guided lever link is fixed to the sector gear and the driving lever link is fixed to the proximal end of the torsion bar such that the lesser rotational output of the gear reduction system is transferred to the proximal end of the torsion bar.

28. The aircraft as in claim 27, wherein the linkage system comprises a sector gear operatively connected to the gear reduction system and fixed to the guided lever link.

29. The aircraft as in claim 28, wherein the cable reel comprises a pinion gear and the reduction gear system comprises a pair of reduction gears intermeshed between the pinion gear and the sector gear so as to receive the rotational input from the cable reel and generate the lesser rotational output.

30. The aircraft as in claim 28, wherein the driving lever link is fixed to the proximal end of the torsion bar such that the lesser rotational output of the gear reduction system is transferred to the proximal end of the torsion bar.

\* \* \* \* \*